Feb. 2, 1960

C. H. BRUMLEY 2,923,826

TRACKING DEVICE

Original Filed May 20, 1957

INVENTOR.
CORWIN H. BRUMLEY
BY
ATTORNEYS

Feb. 2, 1960     C. H. BRUMLEY     2,923,826
TRACKING DEVICE
Original Filed May 20, 1957     3 Sheets-Sheet 2
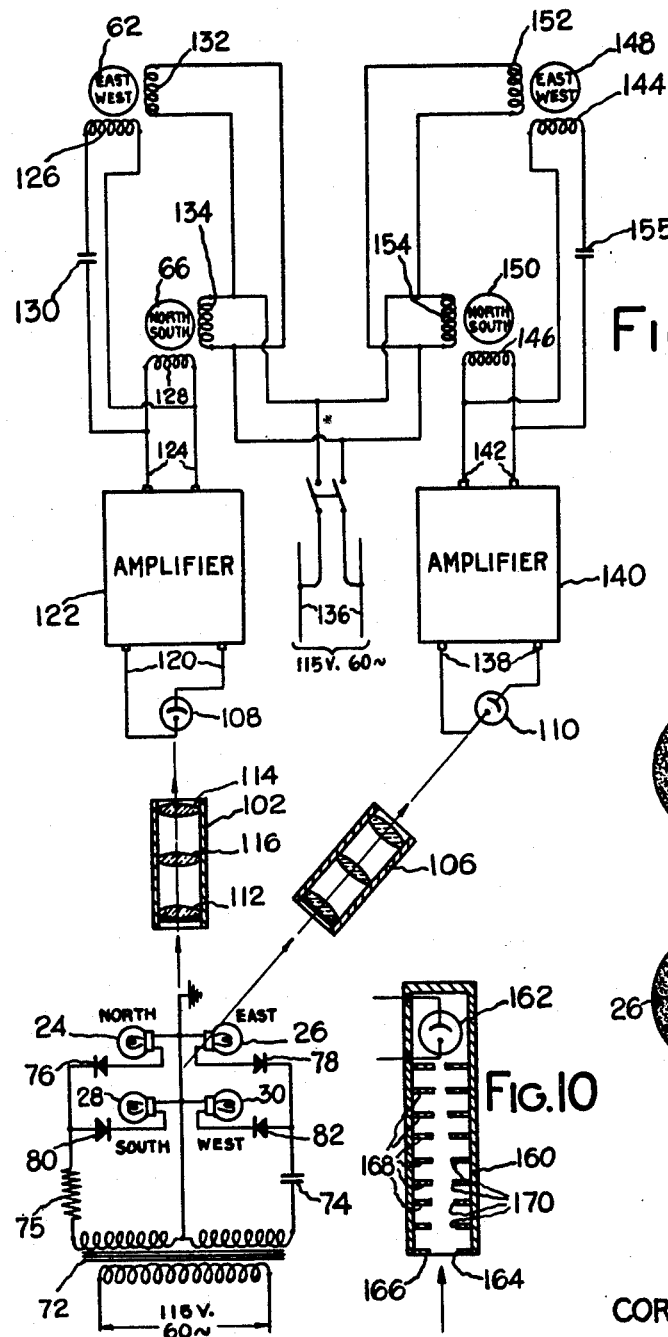
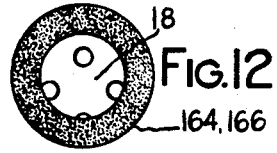
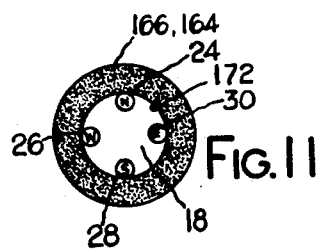
INVENTOR.
CORWIN H. BRUMLEY
BY
ATTORNEYS Feb. 2, 1960 — C. H. BRUMLEY — 2,923,826
TRACKING DEVICE
Original Filed May 20, 1957 — 3 Sheets-Sheet 3

INVENTOR.
CORWIN H. BRUMLEY
BY
ATTORNEYS ated Feb. 2, 1960

United States Patent Office 2,923,826

2,923,826
TRACKING DEVICE

Corwin H. Brumley, Penfield, N.Y., assignor to Bausch & Lomb Optical Company, Rochester, N.Y., a corporation of New York Original application May 20, 1957, Serial No. 660,392. Divided and this application September 26, 1957, Serial No. 686,328

6 Claims. (Cl. 250—201)

This invention relates to tracking devices and more particularly to a tracking device for continuously and automatically orienting the axis of a positionable mechanism with respect to a movable object to be tracked.

The present application is a division of the copending application Serial No. 660,392, filed May 20, 1957.

The present invention includes a motor system for rotating the axis of a positionable mechanism, about two coordinate axes in response to movement of an object. For purposes of illustration, the present invention is combined with a photogrammetric projection apparatus in order to better illustrate the principles of the invention. A lighting system is arranged on the object, and for illustrative purposes the lighting system will be described in association with a plotting table for the projection apparatus. A sensing device, associated with the positionable mechanism, is adapted to respond to the positioning of the lighting system for energizing the motors in accordance with the movement thereof thereby directing the axis of the positionable mechanism substantially onto the center point of the lighting system.

It is the principal object of the present invention to provide an improved tracking system which will continually and automatically track an object in accordance with the movement thereof.

Another object of the invention is to provide a tracking system embodying a novel sensing arrangement which will be swift in its response and capable of accurately directing the axis of a positionable mechanism on an object being tracked.

Other objects and advantages will become apparent from the following description taken in conjunction with the drawings wherein:

Fig. 3 is a diagram showing an electronic circuit adapted to be influenced by the phase relationship and intensities of the light sources associated with the platen;

Fig. 10 is a sectional view of a modification of an element which can be used in the apparatus shown in Fig. 3; and Fig. 11 and 12 represent varying relationships of the element shown in Fig. 10 as viewed by the sensing element under varying conditions.

Figure 1:
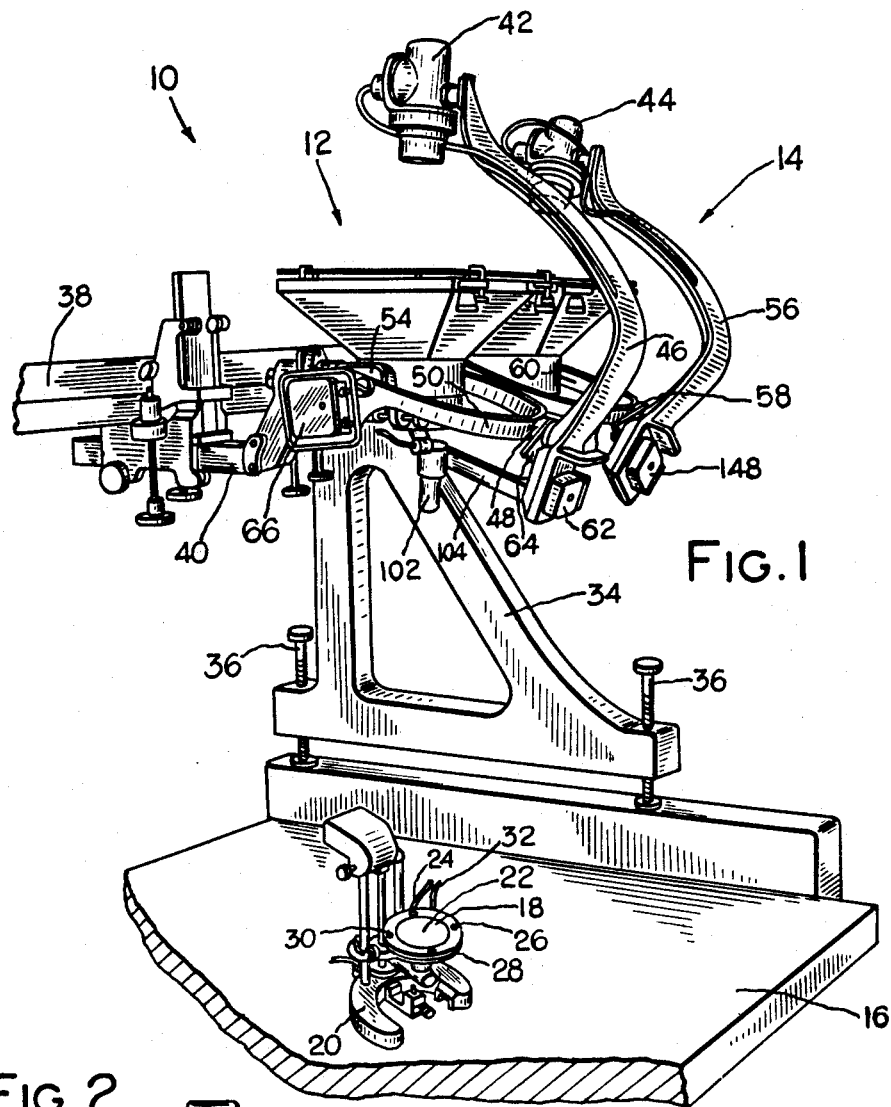
Fig. 1 is a perspective view of a portion of a photogrammetric apparatus showing the present invention applied thereto.

The present invention is adapted to be associated or incorporated in the projection system of a conventional photogrammetric stereomapping apparatus, an example of which is illustrated in Fig. 1 and designated generally by the reference numeral 10.

The apparatus 10 and the components thereof may be of any suitable or conventional construction except for certain components thereof which will be modified for purposes of the present invention. The apparatus 10 includes a pair of suitable projection units generally designated by the reference numerals 12, 14. As is known in the art, the light rays from each of the projectors 12, 14 pass through an optical system which includes a red or blue filter, a diapositive of an aerial photograph being projected and a suitable lens for projecting a red or blue image as the case may be of the photograph. Both images are projected upon the platen 18 of a plotting or tracing table 20 which can be moved about the table 16. The optical axis of each of the projectors 12, 14 is in alignment with the center point 22 of the platen 18 and as the tracing table 20 is moved about the worktable 16, the illuminating devices for each of the projectors 12, 14 are correspondingly moved in order that the axes of the respective projectors thereof remain in alignment with the center point 22.

The tracing table 20 may be of any conventional design and the modification thereof, for purposes of the present invention, resides in the inclusion of four small electric light bulbs 24, 26, 28, 30 arranged circumferentially on the platen 18, 90° apart. For purposes of later description, it will be assumed that each of the lamps corresponds to a point on the compass, that is, the lamps 24, 26, 28, 30 will correspond with the North, East, South, and West points of the compass, respectively. The lamps are arranged equidistant from the point 22 and are preferably located in recessed portions of the platen in order to eliminate any unnecessary projections on the surface of the platen. Suitable conductors 32 are connected to the lamps 24-30 for conveying electrical energy to the lamps from a source to be described hereinafter.

The photogrammetric apparatus 10 is provided with a frame structure 34 (only one of which is shown) mounted on suitable adjustable screws 36 which in turn are supported on the frame of the worktable 16. A horizontally disposed cross bar 38 is supported upon the top of the frame structure 34 and horizontally spaced and slidably mounted on the cross bar are a pair of arm structures 40 (only one shown in Fig. 1) for supporting the projectors 12, 14 above the worktable 16. As is customary in photogrammetric apparatus of this type, the projectors 12, 14 are provided with illumination devices 42, 44 arranged above the projectors, respectively.

The illumination devices provide a narrow cone of light for the photograph to be projected on the platen 18 and in order to facilitate this projection for all positions of the platen, means are provided for permitting universal pivotal movement of the illumination devices. To this end, the illumination device 42 is mounted on the upper end of vertically disposed bow-shaped arm 46 while the lower end of the arm 46 is pivotally mounted by a pivot 48 to the bight portion of a gimbal yoke 50. The ends of the gimbal yoke 50, in turn, are pivotally mounted, on pivots 52, to the adjacent ends of a U-shaped bracket 54 extending from the arm structure 40. Similarly, the illumination device 44 is mounted on the upper end of a bow-shaped arm 56 pivotally connected at 58 to the bight portion of the gimbal yoke 60 which, in turn, is pivotally connected to the arm structure 40 associated with the projector 14. It will be apparent to those skilled in the art that the pivotal arrangement of the gimbal yokes 50 and 60 with respect to the arm structure 40 and the pivotal connections of the arms 46, 56 relative to their respective gimbal yokes will permit universal movement of the illumination devices and, consequently, result in the scanning of the images of the photographs-to-be-projected over a substantial area of the worktable 16.

As previously stated, the projectors 12 and 14 may be of any conventional type and for purposes of this invention, various modifications of the conventional projectors, so far described, have been made in order to implement the present invention. Since the projectors 12 and 14 are duplicates, the modification incorporated in only one of these projectors will now be described. It will be understood that the same modification will apply to the other projector as will hereinafter be described in reference to the electric circuitry of the invention.

Figure 2:
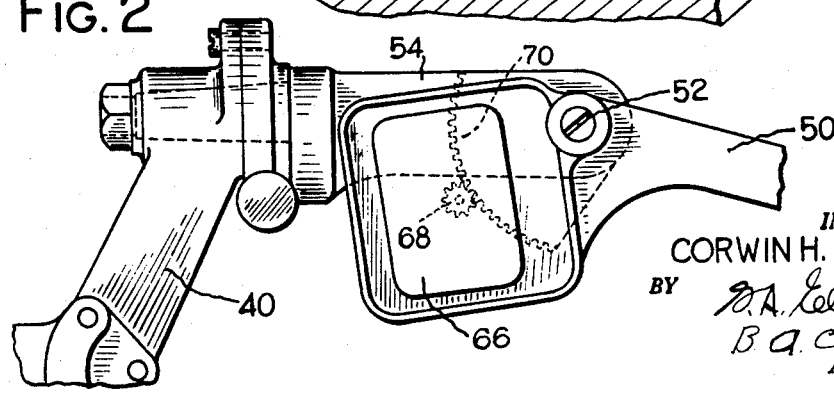
Fig. 2 is a side elevational view of a detail of one of the projectors shown in Fig. 1.

Adjacent the lower end of the arm 46, there is mounted a phase sensitive electric motor 62 which has a suitable drive gear (not shown) connected to the shaft (not shown) of the motor and in mesh engagement with a sector gear 64 secured adjacent the bight portion of the gimbal yoke 50. Upon rotation of the drive gear in either direction of rotation, the same will "walk" along the stationary sector gear 64 for causing rotation of the arm 46 about the pivot 48. A similar phase sensitive or "servo" electric motor 66 is mounted on one of the ends of the gimbal yoke 50 and is provided with a drive gear 68 (see Fig. 2) which is in mesh engagement with a sector gear 70 secured to the bracket 54. Upon rotation of the gear 68 in either direction the same will "walk" on the sector gear 70 and permit rotation of the gimbal yoke 50, and consequently the illumination device 42, about the pivotal axis 52. Similar motors and sector gears are associated with the arm 56 and the gimbal yoke 60 for imparting the same universal movement to the illumination device 44 and since these structures are essentially duplicate, further description of the structure thereof will be unnecessary.

Figure 6:
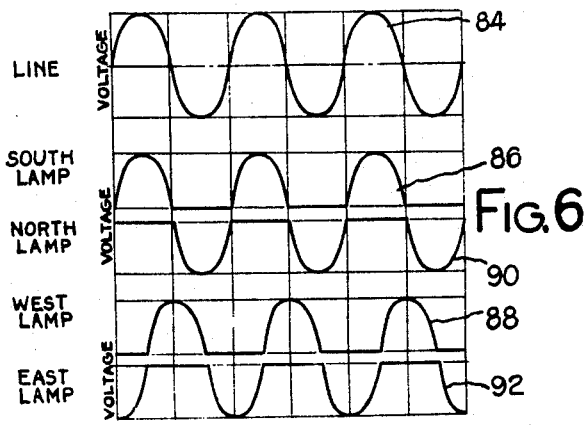
Fig. 6 represents curves showing the relationship of the line voltage and the energizing voltages for each of the light sources.

The electrical circuitry and the remaining mechanical structure of the present invention will now be described. In Fig. 3, the four lamps 24, 26, 28, 30, respectively designated the North, East, South, West lamps, and associated with the tracing table 20, are shown connected to a power supply comprising a transformer 72, a capacitor 74, a resistor 75 and rectifiers 76, 78, 80, 82 connected to the lamps, respectively. The power supply conections are such as to energize the lamps with a half-wave rectified line voltage of 115 v., at 60 cycles. As shown in Fig. 6, the phase of the energizing voltage to each lamp is shifted 90° with respect to each adjacent lamp, for example, with curve 84 representing line voltage and curve 86 representing the energizing voltage of the South lamp, the voltage of the West lamp, represented by curve 88, is 90° out of phase wtih respect to the energizing voltage for the South lamp; the voltage of the North lamp, represented by the curve 90, is 90° out of phase with respect to the voltage for the West lamp; and the voltage of the East lamp, represented by the curve 92, is 90° out of phase with respect to the voltage for the North lamp.

Figure 8:
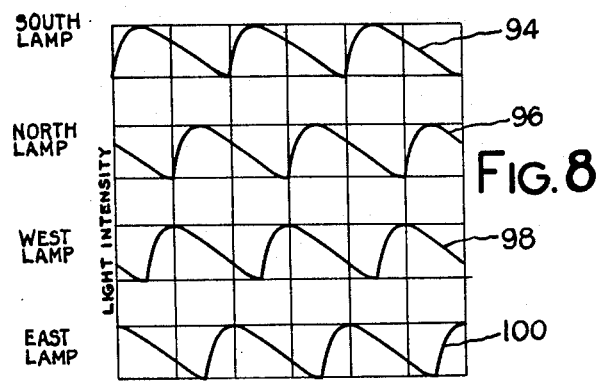
Fig. 8 represents curves showing the relationship of the intensities of each of the light sources in another condition of operation.

The lamps may be of any conventional type and for purposes of this invention the General Electric #327 type lamps were used. As characteristic of all lamps, there is a slight thermal time constant associated with each of the lamps used in the present invention as will be seen in the drawings. The light intensity for each of the lamps is shown in Fig. 8 wherein: numeral 94 denote the South lamp intensity, 96 denotes the North lamp intensity, 98 denotes the West lamp intensity, and 100 denotes the East lamp intensity. As seen in Fig. 8, the thermal time constant for each of the lamps has been illustrated; however, this has negligible effect in the operation of the present invention since, it will be noticed, each of the lamps contains a strong component of modulation at the power supply frequency, namely, 60 cycles.

As will presently be described in more detail, the images of the four lamps 24, 26, 28, 30 and the platen 18 are adapted to be viewed through a sight tube 102 mounted on a support 104 extending from the end of the arm 46 (see Fig. 1). The axis of the sight tube 102 is in coincidence or near coincidence with the optical axis of the projector 12 and as we shall presently see, the purpose of the motors 62, 66 is to continually and automatically direct the axis of the tube 102 and the axis of the illumination device 42 so that the same are in alignment with the center point 22 on the platen 18 as the latter is moved about the worktable 16. A similar tube 106 is associated with the projector 14 and its axis is in coincidence or near coincidence with the optical axis of the projector 14; both axes being directed so that they continuously and automatically remain on the point 22. Each of the lamps 24, 26, 28, 30 are provided with a red filter for blocking or absorbing distracting visible light and permitting the passage of infrared light.

Figure 4:
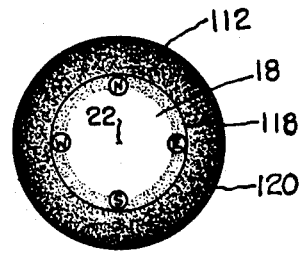
Figs. 4 and 5 represent the varying relationship of the light sources as viewed by the sensing element under varying conditions.
Figure 5:
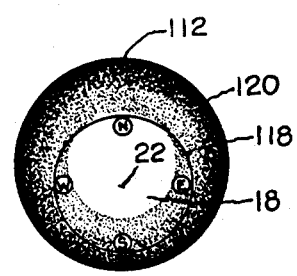

In Fig. 3, the sight tubes 102, 106 are shown in a position with respect to the four lamps for focusing the images thereof on a pair of lead sulphide detectors 108, 110, respectively. Each of the sight tubes (only sight tube 102 will be described) comprises a variable density filter 112 at the end thereof which receives the image forming light rays from the lamps and a focusing element 114 at the other end. An infrared filter 116 may be interposed between the filter 112 and element 116 for insuring the filtering out of all but the infrared light to which the lead sulphide detectors 108, 110 are most sensitive. As shown in Figs. 4 and 5, the variable density filter 112 is of circular symmetry, clear in the center and gradually becoming denser near the periphery. Figs. 4 and 5 show the platen 18 and the lamps as viewed through the sight tubes 102, 106 by the sensing areas of the detectors, the numeral 118 indicating the edge of the platen and the numeral 120 indicating the edge of the field of view. It will be noted in Fig. 4, that the images of the lamps fall upon portions of the filter 112 having equal density whereas, in Fig. 5, the South lamp image falls in a more dense portion than the North lamp image. As will be presently described, in the former case, the electrical system for the present invention is balanced with axes of the illumination devices and the sight tubes in line with the point 22 of the platen.

In Fig. 3, the detector 108 is shown as being connected to the input terminals 120 of an amplifier 122 which serves to amplify a signal generated by the detector and has its output terminals 124 connected to the signal windings 126, 128 of the motors 62, 66, respectively. As shown, the windings 126 and 128 are connected in parallel and the winding 128 has a capacitor 130 connected between one of its ends and one of the output terminals 124. The motors 62, 66 are also provided with field windings 132, 134, respectively, and these are connected in parallel and to a suitable source of alternating current 136 of 115 v. at 60 cycles. As previously stated, the motors 62 and 66 are of the servo type wherein the motor shaft will rotate only when the phase of the current in the signal winding is in quadrature with the field winding. If the current in the signal winding is in phase with or 180° out of phase with the field winding the motor shaft will not rotate. Another characteristic of this type of motor is that the frequency of the signal voltage on the signal winding must be the same as the frequency of the field winding voltage or at least the signal voltage must have a frequency component of the frequency of the field winding voltage.

Similarly, the detector 110 is connected to the input terminals 138 of an amplifier 140 which has its output terminals 142 connected to the signal windings 144, 146 of servo motors 148, 150, respectively. The motor 148 is associated with the arm 56 and the gimbal ring 60 of the projector 14 in exactly the same manner and for the same purpose as the motor 62 for the projector 12. Similarly, the motor 150 performs the same function for the projector 14 as the motor 66 performs for the projector 12. The motors 148, 150 are provided with field windings 152, 154, respectively, and these are connected in parallel and to the source 136. There is a capacitor 155 connected between one end of the windings 144 and one of the output terminals 142 of the amplifier 140.

Figure 7:
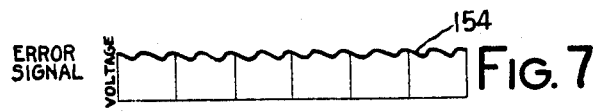
Fig. 7 represents a curve for the error signal resulting from the total effect of the light sources upon the sensing element for one condition of operation.

When the line through the axis of the sight tube 102 is in coincidence with the center point 22 of the platen 18, the electrical system is in balance, that is, the motors 62, 66, 148, 150 are deenergized and the lead sulphide detector 102 will "see" all four lamps 24, 26, 28, 30 at equal intensity, as shown in Fig. 4. With these intensities equal, the electrical error signal produced by the detector will be a summation of the signals generated by the light falling thereon from each of the lamps viewed. The error signal generated by the detector is shown by the curve 154 in Fig. 7 wherein, it is noted, the signal contains no 60 cycle component. Consequently, the error upon reaching the signal windings 126, 128, will have no effect on the motors 62, 66, respectively, since the motors are sensitive only to 60 cycles. In this condition, the electrical system is in balance and the line through the axis of the illumination device 42 is in coincidence with the center point 22.

Since the electronic circuit associated with the sight tube 106 and the projector 14 is similar in all operating respects to the circuit associated with the sight tube 102, the former circuit will likewise be in balance when the line through the axis of the tube 106 is in coincidence with the point 22 of the platen 18.

Figure 9:
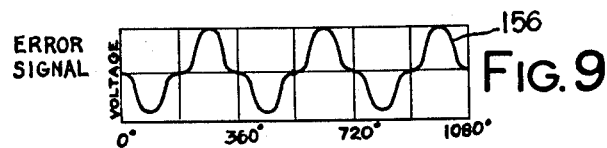
Fig. 9 represents a curve for the error signal resulting from the total effect of the light sources upon the sensing element for another condition of operation.

Assuming now that the tracing table 20 is moved slightly to the south, the detectors 108, 110 will "see" the North lamp at greater intensity than the South lamp. The East and West lamps will still be of equal intensities as shown in Fig. 5. The net 60 cycle signal generated by the detectors 108, 110, and indicated by the numeral 156 in Fig. 9, will be 180° from line phase and in the form shown, will activate the North-South motors 66 and 150 for directing the axes of the sight tubes 102, 106 and the illumination devices 42, 44, respectively, into coincidence with the center point 22 of the platen 18. The same signal, that is, the error signal 156, is fed to the East-West motors 62, 148 but only after being shifted 90° by the capacitor 130, and since this resulting signal is in quadrature with the line voltage, the East-West motors 62, 148 will remain at rest.

In the event the tracing table 20 is displaced in an east-west direction, the resulting error signal will have a 60 cycle component in quadrature with the line voltage and in the form shown would have no effect on the North-South motors 66, 150. The same signal will be shifted by the condensers 130, back to line phase and would set the East-West motors 62, 148 into operation.

In the embodiment of Figs. 10–12, a modification of the sight tubes 102, 106 is shown and this comprises a tube 160 closed at one end for supporting a lead sulphide detector 162 thereat. The detector 162 is adapted to receive light through an aperture 164 formed in a diaphragm wall 166 at the other end of the tube, and a series of diaphragm partitions 168 are interposed between the end diaphragm 166 and the detector 162, each of the diaphragm partitions being formed with apertures 170 which become progressively smaller as they approach the detector. The image of the platen 18 and the lamps, as viewed by detector 162, is shown in Fig. 11 where the electrical system is in balance and in Fig. 12 where the tracing table has been displaced to the south, and in this regard Figs. 11 and 12 are similar to Figs. 4 and 5, respectively. In Fig. 11, the edges of the apertures 164, 166, as designated by the reference numeral 172, are shown fully encompassing all of the lamps 24, 26, 28, 30 at approximately the same distance from the edges 172. Consequently, the light from each of the lamps will fall upon the detector 162 with equal intensity, however, in the event the tracing table is displaced to the south, the South lamp 28 will be covered somewhat, depending upon the amount of movement, by the diaphragms 166, 168. Upon this occurrence, the North-South motors 66, 150 will become energized to direct the axes of the sight tubes and illumination devices in coincidence with the center of the platen whereupon the electrical system once again will be in balance. It will be noted that in the embodiment of Figs. 10–12, there is no variable density filter associated with the tube 160. The equivalent effect is accomplished by the partial or total covering of the particular lamp or lamps concerned by the edges of the various diaphragms.

A pair of the sight tubes 160 may be substituted for the tubes 102, 106 shown in Fig. 3 and the detector 162 may be detached from the tube 160 as is the case for the tubes 102, 106 as long as the detector is adapted to see the platen in the manner previously described in reference to Figs. 11 and 12. Conversely, the optical system comprising the filters 112, 116 and the lens 114 may be incorporated in a tube similar to tube 160 with the detector 108, or 110, as the case may be, mounted within the tube.

From the foregoing description, it will be appreciated that the present invention provides means for continually and automatically directing the axis of a positionable mechanism on an object being tracked. With a novel arrangement of lamps and sequenced energization thereof being associated with the object, response to object movement will be swift and accurate thereby insuring exact alignment of the axis with the object.

While there is in this application specifically described one form and a modification of a part thereof which the invention may assume in practice, it will be understood that this form is shown for purposes of illustration, and that the same may be modified and embodied in various other forms or employed in other uses without departing from the spirit or the scope of the appended claims.

I claim:

1. A tracking system for continuously directing an axis of a positionable mechanism upon an object to be tracked and maintaining this relationship comprising, a source of a modulated signal operatively connected with the object to be tracked and adapted to be moved in accordance with movements of the object, said signal source including a plurality of individual sources of light, each of said individual sources of light having a radiant energy output of a predetermined phase sense and magnitude, said modulated signal being a composite of said individual source of light, radiation sensitive means adapted to receive said modulated signal for generating a second signal having a wave form corresponding to the wave form of said modulated signal reaching said sensitive means, means responsive to said second signal for moving the positionable mechanism to direct the axis thereof in accordance with the deviation of said wave form of said modulated signal reaching said sensitive means from said wave form of said modulated signal, and means for varying the wave form of said modulated signal reaching said sensitive means in accordance with movements of the object.

2. A tracking system for continuously directing an axis of a positionable mechanism upon an object to be tracked and maintaining this relationship comprising, a source of a modulated signal operatively connected with the object to be tracked and adapted to be moved in accordance with the movements of the object, said signal source including a plurality of individual sources of light, each of said individual sources of light having a radiant energy output of a predetermined phase sense and magnitude, said modulated signal being a composite of said individual sources of light, radiation sensitive means adapted to receive said modulated signal for generating a second signal having a wave form corresponding to the wave form of said modulated signal reaching said sensitive means, means responsive to said second signal for moving the positionable mechanism to direct the axis thereof in accordance with the deviation of said wave form of said modulated signal reaching said sensitive means from said wave form of said modulated signal, and means for varying the wave form of said modulated signal reaching said sensitive means in accordance with movements of the object, said last-named means including a filter having a relatively low density portion in the center thereof and progressively denser portions as the radial distance from said center portion increases for modifying said wave form of said modulated signal reaching said sensitive means in proportion to the movement of the object.

3. A tracking system for continuously directing an axis of a positionable mechanism upon an object to be tracked and maintaining this relationship comprising, a source of a modulated signal operatively connected with the object to be tracked and adapted to be moved in accordance with movements of the object, said signal source including a plurality of individual sources of light, each of said individual sources of light having a radiant energy output of a predetermined phase sense and magnitude, said modulated signal being a composite of said individual sources of light, radiation sensitive means adapted to receive said modulated signal for generating a second signal having a wave form corresponding to the wave form of said modulated signal reaching said sensitive means, means responsive to said second signal for moving the positionable mechanism to direct the axis thereof in accordance with the deviation of said wave form of said modulated signal reaching said sensitive means from said wave form of said modulated signal, and means for varying the wave form of said modulated signal reaching said sensitive means in accordance with movements of the object, said last-named means including a diaphragm formed with an aperture through which the said modulated signal is adapted to radiate before reaching said sensitive means whereby movements of the object will permit the edge of said aperture to modify the said modulated signal passing therethrough.

4. A tracking system for continuously directing an axis of a positionable mechanism upon an object to be tracked and maintaining this relationship comprising, a source of a modulated signal operatively connected with the object to be tracked and adapted to be moved in accordance with movements of the object, said signal source including four individual sources of light spaced 90° from each other with respect to a center point, each of said individual sources of light having a radiant energy output of a predetermined phase sense and magnitude, said modulated signal being a composite of said individual source of light, radiation sensitive means adapted to receive said modulated signal for generating a second signal having a wave form corresponding to the wave form of said modulated signal reaching said sensitive means, means responsive to said second signal for moving the positionable mechanism to direct the axis thereof in one direction in accordance with a first phase sense and magnitude of said modulated signal reaching said sensitive means and in another direction in accordance with a second phase sense and magnitude of said modulated signal reaching said sensitive means, and means for varying the wave form of said modulated signal reaching said sensitive means between said first phase sense and magnitude and said second phase sense and magnitude in accordance with movements of the object.

5. A tracking system for continuously directing an axis of a positionable mechanism upon an object to be tracked and maintaining this relationship comprising, a source of a modulated signal operatively connected with the object to be tracked and adapted to be moved in accordance with movements of the object, said signal source including four individual sources of light spaced 90° from each other with respect to a center point, each of said individual sources of light having a radiant energy output of a predetermined phase sense and magnitude, said modulated signal being a composite of said individual source of light, radiation sensitive means adapted to receive said modulated signal for generating a second signal having a wave form corresponding to the wave form of said modulated signal reaching said sensitive means, means responsive to said second signal for moving the positionable mechanism to direct the axis thereof in one direction in accordance with a first phase sense and magnitude of said modulated signal reaching said sensitive means and in another direction in accordance with a second phase sense and magnitude of said modulated signal reaching said sensitive means, and means for varying the wave form of said modulated signal reaching said sensitive means between said first phase sense and magnitude and said second phase sense and magnitude in accordance with movements of the object, said last-named means including a filter having a relatively low density portion in the center thereof and progressively denser portions as the radial distance from said center portion increases for modifying said wave form of said modulated signal reaching said sensitive means in proportion to the movement of the object.

6. A tracking system for continuously directing an axis of a positionable mechanism upon an object to be tracked and maintaining this relationship comprising, a source of a modulated signal operatively connected with the object to be tracked and adapted to be moved in accordance with movements of the object, said signal source including four individual sources of light spaced 90° from each other with respect to a center point, each of said individual sources of light having a radiant energy output of a predetermined phase sense and magnitude, said modulated signal being a composite of said individual source of light, radiation sensitive means adapted to receive said modulated signal for generating a second signal having a wave form corresponding to the wave form of said modulated signal reaching said sensitive means, means responsive to said second signal for moving the positionable mechanism to direct the axis thereof in one direction in accordance with a first phase sense and magnitude of said modulated signal reaching said sensitive means and in another direction in accordance with a second phase sense and magnitude of said modulated signal reaching said sensitive means, and means for varying the wave form of said modulated signal reaching said sensitive means between said first phase sense and magnitude and said second phase sense and magnitude in accordance with movements of the object, said last-named means including a diaphragm formed with an aperture through which the said modulated signal is adapted to radiate before reaching said sensitive means whereby movements of the object will permit the edge of said aperture to modify the said modulated signal passing therethrough.

References Cited in the file of this patent

UNITED STATES PATENTS

| Number | Name | Date |
|---|---|---|
| 1,016,240 | Alexieff | Jan. 30, 1912 |
| 1,589,673 | Winter | June 22, 1926 |
| 1,999,646 | Wittkuhns | Apr. 30, 1935 |
| 2,403,023 | Reynolds | July 2, 1946 |
| 2,492,148 | Herbold | Dec. 27, 1949 |
| 2,513,367 | Scott | July 4, 1950 |
| 2,713,134 | Eckweiler | July 12, 1955 |
| 2,762,123 | Schultz et al. | Sept. 11, 1956 |
| 2,867,393 | Burley | Jan. 6, 1959 |

UNITED STATES PATENT OFFICE

CERTIFICATE OF CORRECTION

Patent No. 2,923,826                February 2, 1960

Corwin H. Brumley

It is hereby certified that error appears in the printed specification of the above numbered patent requiring correction and that the said Letters Patent should read as corrected below.

Column 3, line 72, for "denote" read -- denotes --; column 5, line 11, for "windings" read -- winding --; line 25, before "upon" insert -- signal --.

Signed and sealed this 19th day of July 1960.

(SEAL)
Attest:

KARL H. AXLINE
Attesting Officer

ROBERT C. WATSON
Commissioner of Patents